United States Patent [19]
Prager

[11] Patent Number: 5,302,824
[45] Date of Patent: Apr. 12, 1994

[54] MEASUREMENT OF RELATIVE DETECTOR GAIN

[75] Inventor: Kenneth E. Prager, Los Angeles, Calif.

[73] Assignee: Hughes Aircraft Company, Los Angeles, Calif.

[21] Appl. No.: 984,156

[22] Filed: Dec. 1, 1992

[51] Int. Cl.$^5$ .............................................. G01J 5/00
[52] U.S. Cl. ................. 250/252.1; 250/332; 250/334
[58] Field of Search ................. 250/334, 332, 252.1 A

[56] References Cited

U.S. PATENT DOCUMENTS

| | | |
|---|---|---|
| 4,873,442 | 10/1989 | Klatt ..................................... 250/334 |
| 4,876,453 | 10/1989 | Wirick ................................... 250/332 |
| 5,134,474 | 7/1992 | Hanafusa et al. ..................... 358/113 |

*Primary Examiner*—Constantine Hannaher
*Attorney, Agent, or Firm*—Michael W. Sales; Wanda K. Denson-Low

[57] ABSTRACT

An imaging system including a scanning linear detector array is calibrated with the aid of a source of radiation to provide uniformity in gain among the various detectors of the array. A first memory is provided for storing a map of the source obtained by a scanning through a succession of parallel line scans by means of a single one of the detectors, the detector array being offset between the successive line scans to enable the single detector to perform all of the line scans. A second memory is provided to store an image of the source provided by a scanning by all of the detectors along their respective scan lines. The data obtained in each line scan in each of the memories is averaged. Then, the average value for a scan line stored in the second memory is divided by the average value of the same scan line appearing in the first memory to provide a ratio for each scan line. The ratio is the gain of the detector of the scan line relative to the gain of the first detector. The mapping allows equalization of the gains for eliminating the effect of nonuniformities of the test source from the resultant calculation of the relative detector gains.

8 Claims, 2 Drawing Sheets

MEASUREMENT OF RELATIVE DETECTOR GAIN

BACKGROUND OF THE INVENTION

This invention relates to an array of detectors employed in the scanning of a field of radiation emanating from a source of radiation to provide an image of the source, such as a scanning array detector for imaging infrared radiation. More particularly, the invention relates to a method of measuring the relative gains of the various detectors of the array by use of a reference source of radiation, in accordance with a first aspect of the invention and, in accordance with a second aspect of the invention, provides a procedure for calibrating perturbations of radiation intensity which may be present in the reference source.

Scanning detector arrays may be employed for forming images of various sources of radiation including both acoustic and electromagnetic radiation. In such scanning-array detector imaging systems, it is a common practice to employ a linear array of detectors, and to scan the radiation field past the array in a direction perpendicular to the long dimension of the array. Each of the detectors forms a part of a separate signal-processing channel, and each channel may include amplification and filtering to develop a good signal-to-noise ratio, and may also include, an analog-to-digital converter for producing digitized samples of the analog signal produced by the detector. The samples may be portrayed as an array of samples set forth in rows and columns wherein the samples of each row represent the scan line of a corresponding one of the detectors. The number of samples per scan line is dependent on the sampling rate. In the foregoing representation of a two-dimensional array of samples, each sample is a pixel of the scanned field of radiation. Various implementations may be used, including multiplexing a single analog-to-digital converter to output digitized samples of the respective detectors serially. The scan may also be interlaced.

Of particular interest herein is the use of a scanning detector array for imaging a scene radiating infrared radiation such as imaging systems employed for night vision. In order to ensure that the image produced by such systems is an accurate reproduction of details of the scene being viewed, it is advantageous to have the same signal gain in each detector channel. This is accomplished by a calibration procedure in which the gains of the respective detector channels are measured, and the resultant gain information is employed to adjust the gains of the individual channels so as to equalize the gains.

In a calibration procedure, concern is directed to two sources of error. One source of error is a possible inequality among signal gains of a plurality of detectors of a sensor assembly, and the second source of error is a lack of uniformity in the intensity of radiation emanating from a reference source of radiation employed in the calibration procedure. It is recognized that insufficient uniformity of radiation intensity of the test source can degrade the measurement of relative detector gains in a sensor assembly. Accordingly, a present procedure for calibrating uniformity among plural detector channels includes compensation for source perturbations.

A problem arises in that present methodology in measuring the uniformity among detector channel gains is somewhat unwieldy. A further problem arises in that present procedures for compensating for source perturbations, during a calibration of detector channels, may not be sufficiently accurate for precise imaging of a subject or may require additional test fixturing.

As an example of present procedure in measurement of uniformity among detectors in a scanning detector array, there is employed a slit infrared target which serves as the reference source of radiation. To compensate for possible source perturbations, the source is defocused in an effort to remove temperature nonuniformities in a test subject which serves as a source of radiation. Typically, the unit under test is connected to a test panel which is connected to a digital multimeter or oscilloscope. The baseline-to-peak voltage for each detector is then measured, whether semi-automatically by a computer or manually by a technician. The measurements are then used to calculate the gain uniformity based on some predefined criteria. This procedure is very time consuming, especially if the measurements are made manually by a technician. Also, it is a disadvantage that the defocusing of the source does not always ensure that the nonuniformities in temperature of the radiation source will be removed, this leading to inaccurate results. A disadvantage in the presently available measurement method is that a temperature nonuniformity in an infrared source might result in the discarding of a perfectly good infrared night-vision system in the mistaken belief that the system is faulty wherein, in fact, the failure is in the test infrared source. Clearly, such an event would lead to production delays and additional costs.

SUMMARY OF THE INVENTION

The aforementioned problem is overcome and other advantages are provided by a method, in accordance with the invention, for measuring the relative gain of detectors in an array of detectors scanning a field of radiation emanating from a test source. The invention allows one to attain the requisite data and to calculate the gain uniformity in a minimal amount of time, thus reducing test time and reducing the cost of the test. Importantly, in the case of an infrared test source, temperature nonuniformities may be accounted for so as to be factored out of the calculation of gain uniformity. This provides for a much more reliable measurement process.

The measuring method is intended for use for a scanning detector array in which the detectors are arranged in a linear column or row, and wherein a scanning of a radiation field, incident upon the detector array, is accomplished in a direction perpendicular to the longitudinal direction of the array. With this configuration of a scanning-array imaging system, there is produced an image comprising a set of pixels arranged in a raster of rows and columns. Each row provides imaging data obtained in a scan line of a specific one of the detectors of the array. For example, in a non-interlaced system there are N detectors that produce N scan lines. And, if there are M samples taken of the outputted detector signal of each detector in each scan line, the resulting array of pixels is arranged in a raster of N rows and M columns.

In accordance with the invention, the method begins by designating a set of scan lines corresponding to respective detectors of the array, a first set of the scan lines being scanned by the first of the detectors, an Nth one of the scan lines being scanned by an Nth one of the detectors. The invention provides a method of measuring the relative gains of the various detectors of the array by use of a reference source of radiation, in accordance with a first aspect of the invention and, in accordance with a second aspect of the invention, provides an optional procedure for calibrating perturbations of radiation intensity which may be present in the reference source. The average values of detector gain for each of a plurality of detector channels is employed to equalize the channel gains so as to provide a uniformity of gain for all of the detectors.

For calibrating the source, the methodology of the invention provides for a mapping of the source, the mapping being accomplished by activating only the first detector while the other detectors are inactive. In the mapping step, one of the detectors is employed to scan the entire portion of the source to be imaged. Thereby, any variation in the detector output signal is due only to the source. This produces a map of the source which allows any nonuniformities to be factored out of the detector gain uniformity calculations.

The mapping step is accomplished by providing a succession of scans with the first detector, and offsetting the position of the array relative to the field of radiation being scanned. The offsetting is accomplished repetitively, there being one offset between each of the successive scans to enable the single detector to scan all of the lines which would be scanned normally by the respective ones of the detectors. In the apparatus for practicing the invention, the detector array is held at a point distant from a pivot axis, the distance being sufficient to allow the offsetting to be accomplished by a slight tilting of the housing, including the detector array and the scanning mirror, about the pivot axis. Alternatively, means may be employed to translate the temperature source to provide this action. In this fashion, a single detector scans all of the scan lines of the raster to provide a complete map of that portion of the source which is being imaged by the imaging system. Alternatively, each detector may be scanned across the same narrow area of the source and the average of each detector's output normalized. Then the two methods are equivalent.

The method of calibrating gain uniformity continues with a scanning of the source by all of the detectors in the array. Each of the detectors scans its designated portion of the temperature source. Thereupon, the data of the respective scan lines obtained during the mapping step, and also the data obtained for each scan line during the scanning step, are averaged for each scan line. Then, in each scan line, the average of the data obtained during the step to provide the relative gain of an individual detector channel relative to the gain of the channel containing the first detector.

BRIEF DESCRIPTION OF THE DRAWING

The aforementioned aspects and other features of the invention are explained in the following description, taken in connection with the accompanying drawing wherein.

DETAILED DESCRIPTION

Figure 1:
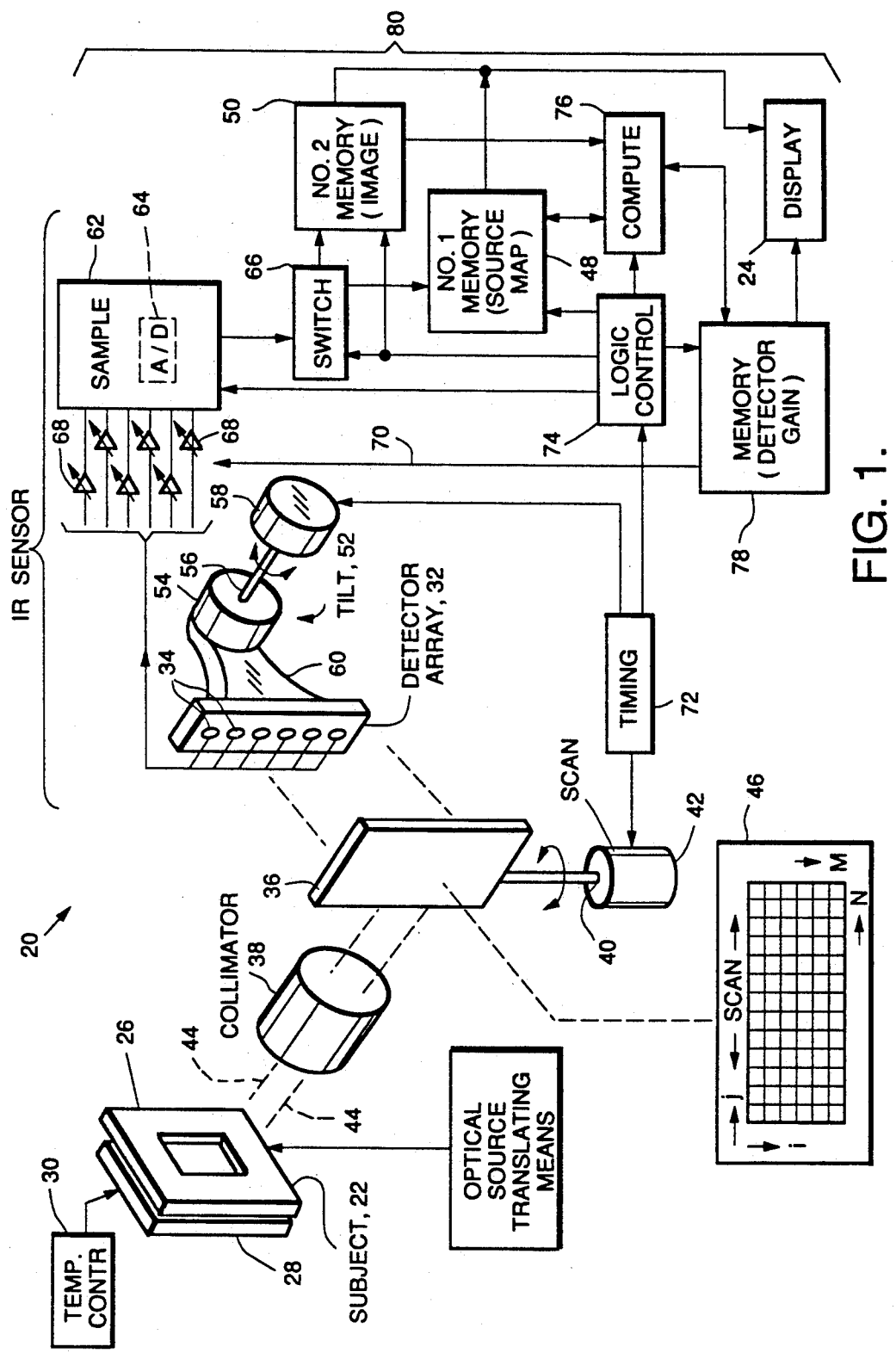
FIG. 1 is a block diagram of an imaging system having a scanning detector array, the system including circuitry for implementing the method of the invention.

FIG. 1 shows a system 20 which produces an image of a subject 22, the image appearing on a display 24. By way of example in the practice of the invention, the subject 22 is shown as a test source of infrared radiation comprising a front element 26, and a rear element 28 disposed directly behind the front element 26. The front element is at room temperature, for example, 72 degrees Fahrenheit. The rear element 28 is set by a temperature controller 30 to a temperature slightly higher than the temperature of the front element 26, for example, 1 degree higher than the temperature of the front element 26 to place the rear element 28 at a temperature of 73 degrees Fahrenheit. A square-shaped central portion of the front element 26 is open in the manner of a window to expose a surface of the rear element 28. If desired, other well-known configurations of front panel, such as a sequence of slits (not shown) may be employed.

Briefly, the system 20 is employed for calibrating an infrared (IR) sensor comprising a scanning mirror and an array of detectors operative with the scanning mirror, as will be described in detail hereinafter, to output signals via detector channels having adjustable-gain amplifiers. There are two aspects to the calibration. In a first aspect, the system 20 allows for the calibration of individual detector channels so as to provide uniform detector gain. In a second aspect of the invention, the system 20 employs the IR sensor for calibrating uniformity of the radiating surface of the subject 22 which serves as the source of the infrared radiation during the calibration of the detector channels. In the ensuing description, the components of the IR sensor are regarded as part of the system 20 to facilitate description of the system 20 in carrying out both of the foregoing aspects of the invention.

The system 20 includes an array 32 of detectors 34 of infrared radiation, and a mirror 36 which provides for a scanning of a field of infrared radiation emanating from the subject 22 by the detector array 32. The scanning of the radiation field is accomplished, in the embodiment of the system 20 shown in FIG. 1 by locating the detector array 32 at a fixed position relative to the subject 22, and directing rays of radiation from the subject 22 via a collimator lens 38 and the mirror 36 to the detectors 34 of the array 32. The mirror 36 is mounted pivotally via a shaft 40 to a motor 42 which rotates the mirror 36 about the shaft 40 to scan the radiation field past the detector array 32. The mirror 36 may rotate continuously in one direction, or may rotate with oscillatory movement to provide a succession of scans of the field of radiation past the array 32. The detectors 34 are arranged, in the embodiment depicted in FIG. 1, as a linear columnar array coplanar with the shaft 40; however, the principles of the invention can be employed with other arrangements of the detectors 34 including a curved array (not shown). The radiation field is indicated by rays 44.

The transverse orientation of the array 32 relative to the direction of sweeping of the radiation rays incident upon the respective detectors 34 produces a raster scan as is presented diagrammatically at a raster 46. The scanning direction is indicated horizontally in the raster 46. Radiation detected by each of the detectors 34 is represented by a separate horizontal row of the raster 46. The portion of the subject 22 being viewed at one instant of time by the detectors 34 is represented by a vertical column of the raster 46. Each cell of the raster 46, at the intersection of a row and a column, represents a sample of data in radiation detected by one of the detectors 34 at a specific instant of time. In the ensuing description, reference will be made to the number of rows of the raster 46, there being N rows, and to the number of columns, there being M columns. Also, the letters i and j will be used as running indices to identify, respectively, individual ones of the rows and individual ones of the columns.

In accordance with the invention, the system 20 is employed to provide both an equalization of gains of the detector channels (gain uniformity) by a scanning of the subject 22, and a mapping of the subject 22 for calibrating uniformity of radiation intensity emanating from a surface of the subject 22. The mapping procedure is similar to that of the scanning of the gain-uniformity procedure except that, in the mapping procedure, only one detector is employed for scanning the complete portion of the radiation field presented by the raster 46. In the general case, the mapping procedure is accomplished by a sequence of steps in which the radiation field is scanned past the single detector to provide data of the first scan line of the raster 46. Then the relative position between the single detector and the radiation field is altered so that, upon a subsequent scan of the field past the single detector, the detector detects the portion of the field presented by the second scan line of the raster 46. The mapping procedure continues by providing further scanning of the field by the single detector, with the single detector being displaced relative to the field between the subsequent scannings so as to provide a sequence of scan lines corresponding to the scan lines of the raster 46. In the practice of the invention, the gain-uniformity procedure may be performed before the mapping procedure, or alternatively the mapping procedure may be performed before the gain-uniformity procedure.

The system 20 includes two memories 48 and 50 for storing image-data, the first memory 48 being employed to store data obtained during the mapping procedure, and the second memory 50 being employed to store image data obtained during the gain-uniformity procedure. The array 32 of detectors 34 in combination with the scanning mirror 36 constitutes the IR sensor, the IR sensor being enclosed within a housing 52.

In the practice of the mapping procedure, it is convenient to select, for the single detector, one of the detectors 34, such as the detector 34 at the top of the array 32. This detector produces the first line scan at the top of the raster 46. In order to accomplish the offsetting of the single detector relative to the radiation field between successive ones of the scans in the mapping procedure, the system 20 is provided with a tilt mechanism 54. The tilt mechanism 54 comprises a shaft 56 which supports the housing 52, the housing 52, the housing 52 and the shaft 56 being rotatable about an axis of the shaft 56 by means of a motor 58. The detector array 32 and the scanning motor 42 are carried by an arm 60 which locates the mirror 36 relative to the array 32, and connects with the housing 52 for tilting therewith. During a scanning of the radiation field past the detector array 32, the housing 52 is held in a predetermined reference position by the motor 58. During the mapping procedure, prior to each scan of the mapping procedure, the housing 52 is indexed rotatably to a different orientation which brings the first detector 34 to the requisite position relative to the radiation field for producing the next scan line of the raster 46.

The system 20 further comprises a sampling circuit 62 which includes an analog-to-digital converter 64, a switch 66 for connecting the sampling circuit 62 to the memories 48 and 50, and a set of amplifiers 68 coupled via a sensor electronics unit 70 for connecting individual ones of the detectors 34 to the sampling circuit 62. The amplifiers 68 and the sensor electronics unit 70 also constitute a part of the IR sensor and are located within the housing 52. By way of example, the electronics unit 70 may comprise averaging circuitry and other noise reduction circuitry. As an example of averaging, the mirror 36 may provide a few line scans (possibly 3 or 4 scans) for each detector 34 at a specific angle of tilt of the housing 52, with the electronics unit 70 outputting data of a single line scan equal to an average of the data received by the few line scans.

In operation, the detectors 34 output electric signals in response to radiation incident upon the detectors 34. The amplifiers 68, in accordance with well-known practice in the construction of infrared imaging systems, amplify the detector signals and, in cooperation with the electronics unit 70, serve to couple the detector signals at a desired impedance level to the sampling circuit 62 to enable accurate sampling of the detector signals. Also, if desired, the amplifiers 68 may include well-known bandpass filters for filtering the detector signals to optimize signal-to-noise level. It is also desirable to provide each of the amplifiers 68 with the feature of adjustable gain so as to compensate for variations in the gains of the various detectors 34.

It is particularly advantageous, for the generation accurate image of the subject 22 upon the display 24 to provide each detector channel, comprising a detector 34 and its following amplifier 68, with the same signal gain. This is accomplished by adjusting the gains of the respective amplifiers 68 after a measurement of the individual detector channel gains in accordance with the procedure of the method of the invention. Adjustment of the gains of the amplifiers 68 may be made manually, or automatically in response to signals (to be described hereinafter) on line 68A. Also included in the system 20 are a timing unit 72, a logic control unit 74, a computation unit 76 for producing mathematical computations, and a memory 78 for storing values of computed gains of the various detectors 34.

In operation, the timing unit 72 provides signals for activating the motors 42 and 58. In the procedure for calibrating uniformity of the detector channels, the scanning motor 42 is activated to scan the rays 44 past the array 32 of the detectors 34. In the mapping step, for measurement of the uniformity of radiation intensity of the subject 22, both of the motors 42 and 58 are activated, the tilt motor 58 providing a succession of desired tilts for the housing 52 while the scan motor 42 scans radiation past the first of the detectors 34. The logic control unit 74 is responsive to timing signals of the timing unit 72 for directing operation of the sampling circuit 62, the switch 66, the computation unit 76, and the memories 48, 50, and 78. Samples of the detector signals 34 are provided by the sampling circuit 62, and are routed by the switch 66 to either the first memory 48 during the mapping procedure, or to the second memory 50 during the scanning of the gain uniformity procedure. In the construction of the sampling circuit 62, a plurality of converters 64 may be employed with one converter coupled to each of the amplifiers 68 for converting the analog format of the detector signals to digital format suitable for storage in the memories 48 and 50. Alternatively, if desired, well-known multiplexing circuitry (not shown) may be included within either the electronics unit 70 or the sampling circuit 62 in conjunction with a single converter 64, the multiplexing circuitry serving to connect sequentially the outputs of the amplifiers 68 to the single converter 64 for sampling and digitizing the respective detector signals. Each signal sample constitutes one cell of the raster 46 and one pixel of an image presented on the display 24. In terms of the operation of the system 20, the digital portions of the system 20, namely, the sampling circuit 62 and the memories 48, 58, and 78, as well as the computation unit 76 and the logic control unit 74 may be regarded as an image processor 80.

In order to increase further to signal-to-noise ratio, the scan produced during the scanning and the mapping may be repeated several times, and the pixel data obtained for each pixel is averaged to provide an average value of pixel data at each of the cells of the raster 46. Since the data stored in the memories 48 and 50 are in digital format, the image processor 80 can readily perform the averaging of the pixel data by use of the computation unit 76. In accordance with instructions of the logic control unit 74, the memories 48 and 50 store pixel data for each of the scans, and the computation unit 76 averages the stored data for each of the pixels to provide the desired average value of pixel data. Then, the raw pixel data in each of the memories 48 and 50 is replaced with the averaged pixel data.

In accordance with an ensuing mathematical description, the relative gains of the detectors 34, relative to the first detector 34 used in the mapping procedure, are established by using stored pixel signals wherein each pixel signal is the average of the detector signals for that pixel. As will be shown in the mathematics, the gains are proportional to the average of all of the pixel signals stored in the memories 48 and 50 for any single scan line of the raster 46. Therefore, calculations of relative gain can be made by use of mathematical manipulations of the stored pixel signals. The requisite computations are made by the computation unit 76 under control of the logic unit 74, and the resultant relative gains for each of the detector channels are stored in the memory 78. Data stored in any one of the memories 48, 50, and 78 may be viewed on the display 24.

By way of example in the use of the system 20, and the methodology of the invention for determining uniformity of gain among the detectors 34 and their respective signal channels, the IR sensor employed with the collimator 38 and the image processor 80 might be regarded as a night vision system. There follows a mathematical section providing a mathematical basis for the practice of the method of the invention, this being followed by a flow chart explaining operation of the system 20, particularly the image processor 80. With respect to construction of the system 20, the function of the timing unit 72, the logic control, unit 74, and the computation unit 76 may be provided by a digital computer programmed in accordance with the flow chart of FIG. 2.

MATHEMATICAL BASIS FOR METHOD

The procedures consists of three parts, temperature source calibration (Optional), gain uniformity measurement and gain uniformity calculation. The temperature source calibration is optional if it is assumed that the source is uniform or if the IR sensor is defocused, such that the source appears uniform. If the temperature source is to be calibrated, the procedure can be performed separately or as part of the gain uniformity measurement. If calibration is performed as part of a separate procedure, then the IR sensor must be rotated such that detector 1 views the entire temperature source. If calibration is performed as part of the gain uniformity measurement, then the IR sensor must be rotated such that each detector views the same portion of the temperature source.

For simplicity, it is assumed that there is a one-to-one mapping between the IR sensor and the image processor. The following terms are then defined:

$x_i$ = gain of detector at row i; where i = 1...N
$A_{i,j}$ = temperature source effect at position i,j; where j = 1...M
$\bar{A}_i$ = average temperature source effect at row i
$y_{i,j}$ = output after temperature source calibration at position i,j
$\bar{y}_i$ = average output after temperature source calibration at row i
$z_{i,j}$ = output after gain measurement at position i,j
$\bar{z}_i$ = average output after gain measurement at row i
$u_i$ = normalized detector gain at row i Assume that there are at least two N×M image memories in the image processor. $y_{i,j}$ is stored in Memory 1 at pixel position i,j. $Z_{i,j}$ is stored in Memory 2 at pixel position i,j.

CASE 1

Temperature Source Calibration-Detector 1 Views the Entire Source 1.1 Temperature Source Calibration The IR sensor is positioned such that the first detector views the top of the temperature source. Several frames of data are captured and averaged together (to reduce random noise) by the image processor and the data corresponding to the first detector is stored in Memory 1 at position 1,j. The IR sensor is then repositioned vertically so that detector 1 views the portion of the scene formerly viewed by detector 2. Data is again captured and now the data line corresponding to detector 1 is placed in Memory 1 at position 2,j. This is repeated N times. Thus, the data in Memory 1 at pixel position i,j is equal to $$y_{i,j} = x_i A_{i,j}$$

If the data in line i, corresponding to the $i^{th}$ detector, is averaged together, then $$\bar{y}_i = \frac{1}{M} \sum_{j=1}^{M} x_i A_{i,j}$$

which is equal to $$\bar{y}_i = x_i \bar{A}_i$$

1.2 Gain Uniformity Measurement

The IR sensor is returned to its original position. Video frames are again averaged together and the data corresponding to the first detector is stored in Memory 2 at position 1,j. The data line corresponding to detector 2 is placed in position 2,j, and so on. Thus, the data in Memory 2 at pixel position i,j is equal to $$z_{ij} = x_i A_{i,j}$$

If the data in line i, corresponding to the $i^{th}$ detector, is averaged together, then $$\bar{z}_i = \frac{1}{M} \sum_{j=1}^{M} x_i A_{i,j}$$

which is equal to $$\bar{z}_i = x_i \bar{A}_i$$

1.3 Gain Uniformity Calculation

In order to calculate the uniformity, the effects of the temperature source must be removed. This is accomplished by $$\bar{u}_i = \frac{\bar{z}_i}{\bar{y}_i} = \frac{x_i \bar{A}_i}{x_1 \bar{A}_i}$$

which is equal to $$\bar{u}_i = \frac{x_i}{x_1}$$

Thus, $\bar{u}_i$ is the gain of the $i^{th}$ detector after the temperature source effects have been removed. Gain uniformity can be calculated a number of different ways depending upon the predefined criteria. Most generally, this is done by comparing the gain of the individual detectors to the average gain.

CASE 2

Temperature Source Calibration-Detector (i) Views a Constant Part of the Temperature Source

2.1 Gain Uniformity Measurement

The IR sensor is placed in position 1. Video frames are averaged together and the data corresponding to the first detector is stored in Memory 2 at position 1,j. The IR sensor is removed such that the second detector views the portion of the temperature source previously viewed by detector one and video frames are again averaged. The data line corresponding to detector 2 is placed in position 2,j, and so on. Thus, the data in Memory 2 at pixel position i,j is equal to $$z_{i,j} = x_i A_{i,j}$$

If the data in line i, corresponding to the $i^{th}$ detector, is averaged together, then $$\bar{z}_i = \frac{1}{M} \sum_{j=1}^{M} x_i A_{1,j}$$

which is equal to $$\bar{z}_i = x_i \bar{A}_1.$$

2.2 Gain Uniformity Calculation

In order to calculate the uniformity, the effects of the temperature source must be removed. This is accomplished by $$\bar{u}_i = \frac{\bar{z}_i}{\bar{z}_1} = \frac{x_i \bar{A}_1}{x_1 \bar{A}_1},$$

which is equal to $$\bar{u}_i = \frac{x_i}{x_1}.$$

Thus, $\bar{u}_i$ is the gain of the $i^{th}$ detector after the temperature source effects have been removed. Gain uniformity can be calculated a number of different ways depending upon the predefined criteria. Most generally, this is done by comparing the gain of the individual detectors to the average gain.

CASE 3:

No Temperature Source Calibration

3.1 Gain Uniformity Measurement

Video frames are averaged together and the data corresponding to the first detector is stored in Memory 2 at position 1,j. The data line corresponding to detector 2 is placed in position 2,j, and so on. Thus, the data in Memory 2 at pixel position i,j is equal to $$z_{i,j} = x_i A_{i,j}.$$

If the data in line i, corresponding to the $i^{th}$ detector, is averaged together, then $$\bar{z}_i = \frac{1}{M} \sum_{j=1}^{M} x_i A_{i,j},$$

which is equal to $$\bar{z}_i = x_i \bar{A}_i.$$

3.2 Gain Uniformity Calculation

In this case, the temperature source is assumed to be uniform or is made to be uniform by defocusing the IR sensor. Thus, $$A_i \approx A_j \;\forall\, i,j.$$

In order for the data from this method to agree with the other two methods, the data from each detector is normalized by the first detector. This is accomplished by $$\bar{u}_i = \frac{z_i}{z_1} = \frac{x_i \bar{A}_i}{x_1 \bar{A}_1}.$$

Since the effects of the temperature source are constant, this is approximately equal to $$\bar{u}_i \approx \frac{x_i}{x_1}.$$

Thus, $\bar{u}_i$ is the gain of the $i^{th}$ detector after the temperature source effects have been removed. Gain uniformity can be calculated a number of different ways depending upon the predefined criteria. Most generally, this is done by comparing the gain of the individual detectors to the average gain.

FLOW CHART

Figure 2:
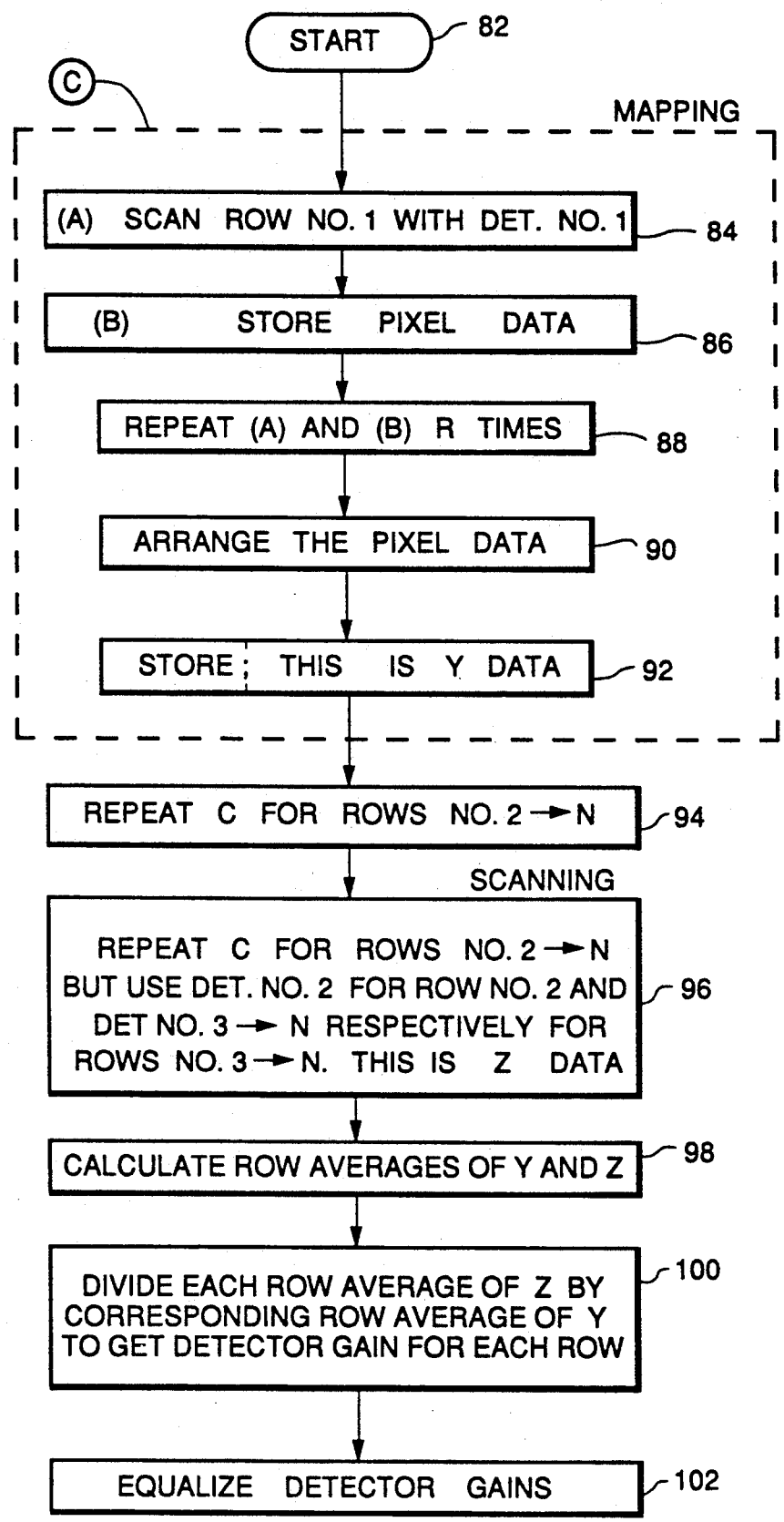
FIG. 2 is a flow chart describing operation of the system of FIG. 1 in the implementation of the method of the invention.

FIG. 2 shows operation of the system 20 beginning with the mapping procedure for measurement of the uniformity of radiation from the subject 22, followed by the procedure for calibrating the gain-uniformity of the array 32 of detectors 34. The operation begins at block 82 and proceeds to a set of steps enclosed in block C, indicated in phantom lines, which is the mapping procedure. The first step, block 84, of the mapping procedure is also identified as step A and provides for s scanning of row 1 of the raster 46 with the first detector 34 (FIG. 1). Upon sampling and digitizing the detector signal, the pixel data is stored in the first memory 48, block 86, this step also being identified as step B. Then, at block 88 there is a repetition of the steps A and B to provide additional signals of the detector for the first scan line of the raster 46 so as to permit an averaging of the raw data of each pixel to provide an average value of the pixel data. In block 88, the steps A and B are repeated R times where R may be equal to 3, 5, 8, or some other number of repetitions desired for the averaging process. The stored raw data is withdrawn from the memory 48 and averaged at block 90 to produce the average value of the pixel data. The average value of the pixel data is stored in the first memory 48 at block 92, the averaged or smoothed pixel data being represented by the letter y in the mathematical description. Blocks 84–92 constitute a sequence of steps of the mapping procedure C for providing pixel data of the first row of the raster 46. At block 94, the steps of the mapping procedure are repeated for the remaining rows of the raster 46. This is accomplished by offsetting the IR sensor by the tilt mechanism 52 prior to each repetition of the steps of the mapping procedure C so as to position the first detector 34 at each of the successive scan lines of the raster 46.

The method of the invention then advances, at block 96 to the detector gain-uniformity procedure. Herein, the detector array 32 is positioned by the tilt mechanism 52 at the reference position, and all of the detectors 34 are activated to scan simultaneously their respective lines of the raster 46. This is in contradistinction to the mapping procedure wherein only the first of the detectors 34 is activated. As used herein, the term "activating" means to extract data from the detector, and is accomplished readily by directing the sampling circuit 62 to sample the output signal of a specific one or ones of the detectors 34. Thus, in the case of the mapping procedure, the sampling circuit 62 is operated to sample only the signals of the first of the detectors 34 while, during the detector gain-uniformity step of block 96, output signals of all of the detectors 34 are sampled by the sampling circuit 62. Alternatively, if desired, activation can be accomplished by applying an electrical voltage to a terminal of a detector 34, with deactivation being accomplished by removal of the voltage. The average pixel data obtained in the scanning step 96 for the respective rows, or scan lines, of the raster 46 are stored in the second memory 50. This data is represented by the letter z in the mathematical description.

The method proceeds to block 98 for calculation of average value y and z, this being in accordance with the equations in the mathematical description for calculation of the average values of y and z for each row of the raster 46. At block 100 the row averages of z are divided by the corresponding row averages of y to obtain the relative gain of each detector channel of the respective rows of the raster 46 relative to the gain of the first of the detector channels at the first row of the raster 46. This information is stored in the memory 78. If desired, corrective electrical signals, corresponding to these values of gain, may be stored also in the memory 78 to be outputted to respective ones of the amplifiers 68 via line 68A to automatically equalize the detector gains. Alternatively, this information can be used by an operator of the system 20 to manually adjust the gains of the amplifier 68 to equalize the gains of the detector channels. Equalization of the gains is indicated at block 102. Thereafter, further scannings of the subject 22, wherein the subject 22 is a normal scene such as a building or a person rather than a test source of radiation, are accomplished with equalized channel gain with the result that image data stored in the second memory 50 provides for a precise image of the subject 22. The image may be outputted by the memory 50 to the display 24 for presentation to an operator of the system 20.

It is to be understood that the above described embodiment of the invention is illustrative only, and that modifications thereof may occur to those skilled in the art. Accordingly, this invention is not to be regarded as limited to the embodiments disclosed herein, but is to be limited only as defined by the appended claims.

What is claimed is:

1. A method for measuring the relative gains of detectors in an array of detectors scanning a field of radiation emanating from a source, the method comprising steps of:

designating a set of scan lines corresponding to respective detectors of said array, scanning a first of said scan lines by a first of said detectors and scanning an Nth one of said scan lines by an Nth one of said detectors;

scanning said radiation field by said array of detectors with each detector scanning its designated line;

averaging values of radiation detected for each line scan of said scanning step;

mapping said source, said mapping step comprising activating only said first detector while other ones of said detectors are inactive, said mapping step further comprising providing a set of line scans by said first detector while introducing an offset of said array relative to said radiation field between successive ones of said line scans, said offset enabling a scan of each of the N scan lines by said first detector;

averaging values of radiation detected for each line scan of said mapping step; and dividing an average value for each line scan of said scanning step by an average value for a corresponding line of said mapping step to obtain a normalized gain of each of said detectors relative to a gain of said first detector.

2. A method according to claim 1, wherein said offsetting is accomplished by a tilting of said detector array relative to said radiation field.

3. A method according to claim 1 wherein said radiation is infrared radiation.

4. A method according to claim 1 further comprising a step of arranging the detectors of said array in a direction transverse to a direction of said scanning.

5. A method for measuring the relative gains of detectors in an array of detectors scanning a field of radiation emanating from a source, the method comprising steps of scanning said radiation field by an array of detectors arranged transversely to a direction of scan, each of said detectors providing a separate line scan;

averaging values of radiation detected for each of said line scans;

providing a scan of each of said lines by use of a single detector;

averaging values of radiation detected for each line scan of said providing step produced by said single detector; and dividing an average value for each line scan of said scanning step by an average value for a corresponding line of said providing step to obtain a gain of each of said detector channels relative to a gain of the channel employing said single detector.

6. A method according to claim 5 wherein said single detector is one of the detectors in said array of detectors.

7. A method according to claim 6, wherein said step of providing includes a further step of offsetting said detector array relative to said radiation field between a scanning of one of said lines and a second of said lines to enable a scanning of each of said lines in said providing step by said single detector.

8. A method according to claim 5 further comprising a step of producing an image of said source from data of the line scans of said scanning step.

* * * * *